US012302209B2

(12) United States Patent
Brown

(10) Patent No.: US 12,302,209 B2
(45) Date of Patent: May 13, 2025

(54) SYSTEM AND METHOD TO PROVIDE EMERGENCY ALERTS

(71) Applicant: Maximus Brown, Brooklyn, NY (US)

(72) Inventor: Maximus Brown, Brooklyn, NY (US)

( * ) Notice: Subject to any disclaimer, the term of this patent is extended or adjusted under 35 U.S.C. 154(b) by 206 days.

(21) Appl. No.: 18/080,094

(22) Filed: Dec. 13, 2022

(65) Prior Publication Data

US 2023/0112743 A1    Apr. 13, 2023

Related U.S. Application Data

(63) Continuation-in-part of application No. 16/119,827, filed on Aug. 31, 2018, now abandoned.

(60) Provisional application No. 62/552,526, filed on Aug. 31, 2017.

(51) Int. Cl.
H04W 4/90 (2018.01)
H04W 4/024 (2018.01)

(52) U.S. Cl.
CPC ............. H04W 4/90 (2018.02); H04W 4/024 (2018.02)

(58) Field of Classification Search
CPC .................. H04W 4/90; H04W 4/024
USPC ........................................................ 340/506
See application file for complete search history.

(56) References Cited

U.S. PATENT DOCUMENTS

| | | | |
|---|---|---|---|
| 9,183,731 B1 | 11/2015 | Bokhary | |
| 9,706,380 B1 | 7/2017 | Murchison | |
| 9,781,247 B1 | 10/2017 | Gadepalli et al. | |
| 2006/0109113 A1* | 5/2006 | Reyes ..................... | G08B 25/14 340/541 |
| 2007/0008104 A1 | 1/2007 | Mcbain | |
| 2008/0048851 A1 | 2/2008 | Reyes et al. | |
| 2009/0018875 A1 | 1/2009 | Monatesti et al. | |
| 2011/0066374 A1 | 3/2011 | Hartman et al. | |
| 2013/0183924 A1 | 7/2013 | Saigh et al. | |
| 2015/0137967 A1* | 5/2015 | Wedig .................... | G08B 7/066 340/501 |
| 2015/0137972 A1* | 5/2015 | Nepo ..................... | G08B 25/10 340/539.13 |
| 2015/0288797 A1 | 10/2015 | Vincent | |
| 2016/0321899 A1 | 11/2016 | Mingo | |
| 2016/0379479 A1 | 12/2016 | Nepo | |
| 2017/0330442 A1 | 11/2017 | Yang | |

* cited by examiner

Primary Examiner — Kerri L McNally
(74) Attorney, Agent, or Firm — ALLEN, DYER, DOPPELT + GILCHRIST, P.A.

(57) ABSTRACT

An emergency detection and alert system includes an emergency server configured to provide an alert to each person on an alert feed list when an emergency event is detected. In addition, the system includes a client device to communicate with the emergency server, and a microphone for detecting audible signals. In addition, the system includes an emergency validator comprising a warning database and a processor. The processor in configured to receive at least one audible signal from the client device, compare the at least one audible signal to the warning database, the warning database having a plurality of warning signals stored therein, and transmit a trigger signal to the emergency server when the at least one audible signal is a match to at least one warning signal of the plurality of warning signals to indicate an emergency event has been detected.

20 Claims, 9 Drawing Sheets

SYSTEM AND METHOD TO PROVIDE EMERGENCY ALERTS

RELATED APPLICATION

This application is a continuation-in-part of pending U.S. patent application Ser. No. 16/119,827 filed Aug. 31, 2018 which claims benefit to U.S. provisional patent application Ser. No. 62/552,526 filed Aug. 31, 2017, all the contents of which are incorporated by reference in their entirety.

TECHNICAL FIELD

The present invention relates to the field of warning systems, and, more particularly, to a system and method to provide emergency alerts and related methods.

BACKGROUND

Home residences and businesses typically are equipped with smoke detectors that are triggered by smoke and emit an audible alarm. The audible alarm alerts persons within range of the smoke detector of a possible fire. However, persons beyond the audible range of the smoke detector can be vulnerable and unaware that the smoke detector has even been triggered. Newer smoke alarms have been developed that are able to wirelessly communicate the alert to a security system or monitoring company.

However, the newer smoke alarms with that feature are costly and the monitoring of the system can also be cost prohibitive for most people. Accordingly, what is needed is a system and method that can provide emergency alerts to persons using existing smoke alarms that do not have any wireless capability or that are required to be monitored by a third party.

SUMMARY

A system and method to provide emergency alerts is disclosed. In a particular aspect, the system includes an emergency server comprising an alert database storing contact information for each person on an alert feed list, and the emergency server configured to provide an alert to each person on the alert feed list using the respective contact information when an emergency event is detected. The system also includes a client device having a display, and configured to communicate with the emergency server, and comprising a microphone for detecting audible signals. In addition, the system includes an emergency validator comprising a warning database for assessing safety situations and a processor. The processor is configured to receive at least one audible signal from the client device, compare the at least one audible signal to the warning database, the warning database having a plurality of warning signals stored therein, and transmit a trigger signal to the emergency server when the at least one audible signal is a match to at least one warning signal of the plurality of warning signal to indicate an emergency event has been detected.

The emergency validator may be configured to transmit the trigger signal in response to manual input of a user. In addition, the emergency validator may be configured to wait a predetermined time period between when the at least one audible signal is a match to at least one warning signal and when the trigger signal is transmitted to the emergency server to provide an opportunity for a user to cancel the alert using the client device before it is transmitted to each person on the alert feed list in the event of a false alarm.

The client device may include a visual indicator configured to be viewable on the display of the client device when the system is operational. The alert may include at least one of a voice message, a siren, email, and text message.

The emergency validator may be configured to determine and transmit a physical location of the emergency event and user location and to associate same with the trigger alert and transmit to the emergency server. The emergency server may also be configured to store pictures and/or video of at an emergency exit proximate to the user location and transmit to the client device, and/or to generate a visual map of a particular egress route to transmit to the client device to guide the user to the emergency exit.

In another particular aspect, a method to provide emergency alerts is disclosed. The method includes operating an emergency server comprising an alert database storing contact information for each person on an alert feed list, and the emergency server is configured to provide an alert to each person on the alert feed list using the respective contact information when an emergency event is detected. In addition, the method includes operating a client device having a display, and configured to communicate with the emergency server, and comprising a microphone for detecting audible signals. The method also includes operating an emergency validator comprising a warning database for assessing safety situations. The operating of the emergency validator includes receiving at least one audible signal from the client device, compering the at least one audible signal to the warning database, the warning database having a plurality of warning signals stored therein, and transmitting a trigger signal to the emergency server when the at least one audible signal is a match to at least one warning signal of the plurality of warning signals to indicate an emergency event has been detected.

Yet another aspect is directed to a non-transitory computer readable medium for operating an emergency validator having a warning database and interfacing between a client device and an emergency server, and with the non-transitory computer readable medium having a plurality of computer executable instructions for causing the emergency validator to perform steps as described above.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
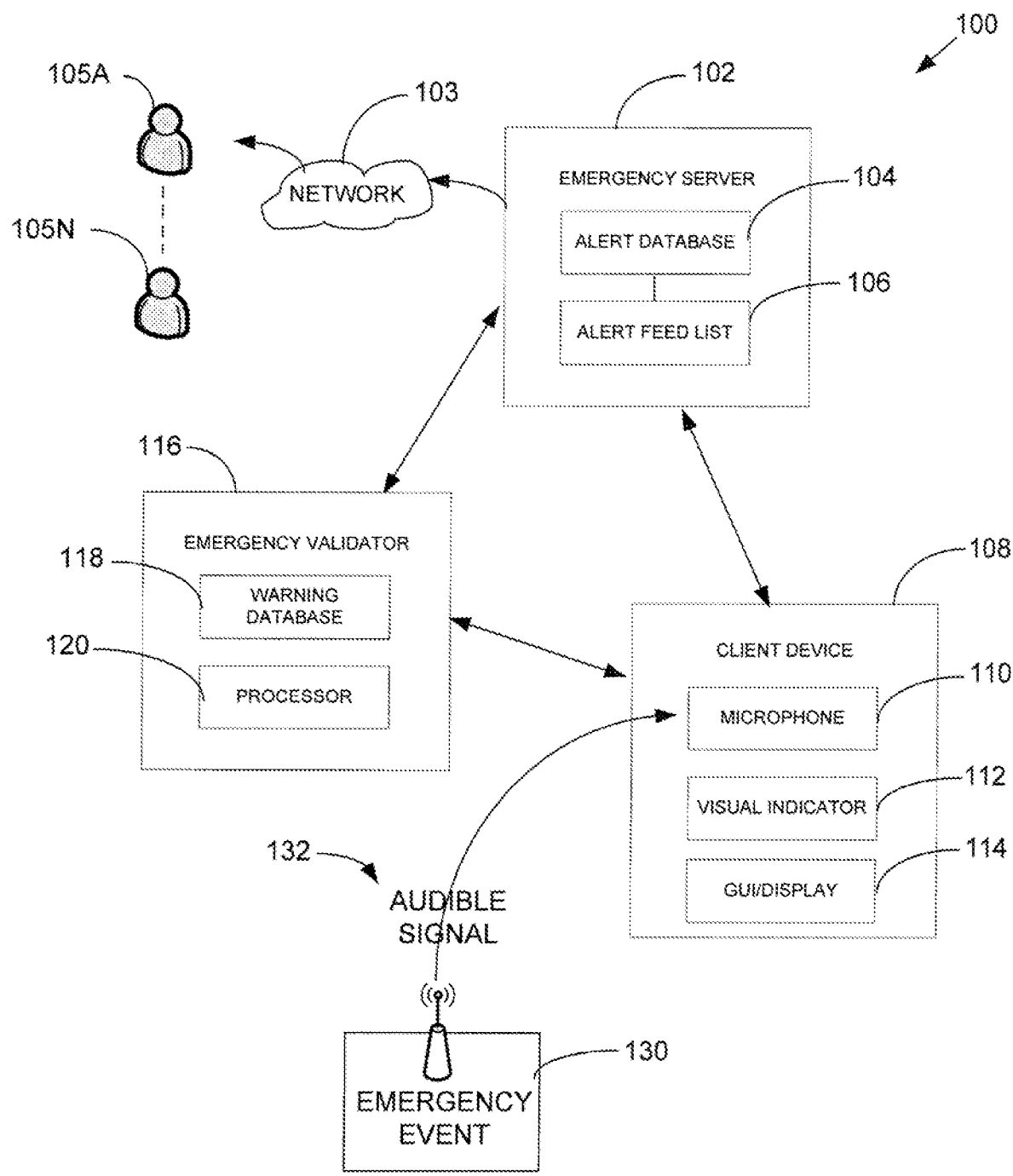
FIG. 1 is a block diagram of an emergency detection and alert system in which various aspects of the disclosure may be implemented.

Referring initially to FIG. 1, a block diagram of an emergency detection and alert system is disclosed and generally designated 100. The system 100 includes an emergency server 102 comprising an alert database 104 storing contact information for each person on an alert feed list 106. The emergency server 102 is configured to provide an alert to each person 105A-105N on the alert feed list 106 via a network 103 using the respective contact information when an emergency event 130 is detected. The system 100 also includes a client device 108 having a GUI/display 114, and is configured to communicate with the emergency server 102. The client device 108 also includes a microphone for detecting any type of audible signals 132 from an emergency event 130. The emergency event 130 could be non-verbal audible signals 132 from a smoke alarm, or audible signals 132 of gunshots, for example, or any other non-verbal audible signals that correlate to an emergency event 132. However, the microphone 110 of the present invention is not tuned to any unique signature of non-verbal audible signals. This in contrast to existing microphones and sensors which are tuned to a unique audible signal and are adjusted to respond only to waves of a particular frequency and are therefore limited. The existing microphones do not have the capability to capture a wide range of different frequencies and respond as in the present system 100. The system 100 is not tuned to any unique signature of the non-verbal audible signals but rather can process all non-verbal audible signals using a warning database 118 discussed below.

In addition, the system 100 includes an emergency validator 116 comprising the warning database 118 for assessing safety situations and a processor 120. The processor 120 is configured to receive at least one audible signal 132 from the client device 108, compare the at least one audible signal to the warning database 118 where the warning database 118 has a plurality of warning signals stored therein (e.g., smoke alarm audible signals, gunshot audible signal, etc.), and transmit a trigger signal to the emergency server 102 when the at least one audible signal 132 is a match to at least one warning signal of the plurality of warning signals to indicate an emergency event 132 has been detected.

The emergency validator 116 may be configured to transmit the trigger signal in response to manual input of a user as well. In addition, the emergency validator 116 may be configured to wait a predetermined time period between when the at least one audible signal is a match to at least one warning signal and when the trigger signal is transmitted to the emergency server 102 to provide an opportunity for a user to cancel the alert using the client device 108 before it is transmitted to each person 105A-105N on the alert feed list 106 in the event of a false alarm.

The client device 108 may include a visual indicator 112 configured to be viewable on the display 114 of the client device 108 when the system 100 is operational/activated. The alert may include at least one of a voice message, a siren, email, and text message.

The emergency validator 116 may be configured to determine and transmit a physical location of the emergency event 130 and user location and to associate same with the trigger alert and transmit to the emergency server 102. The emergency server 102 may also be configured to store pictures and/or video of at an emergency exit proximate to the user location and transmit to the client device 108, and/or to generate a visual map of a particular egress route to transmit to the client device 10 to guide the user to the emergency exit.

Figure 2:
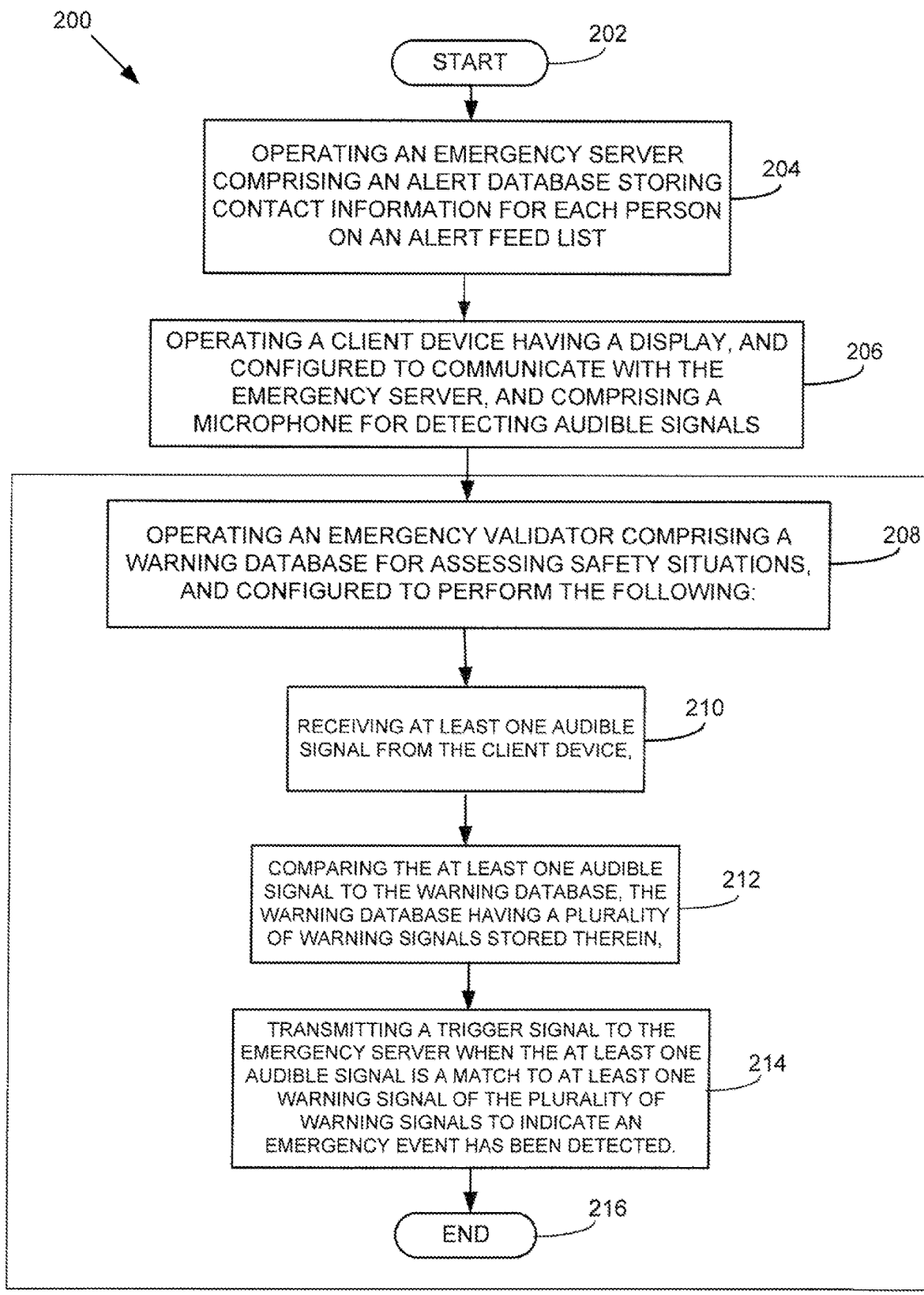
FIG. 2 is a general flowchart illustrating a method for operating the emergency detection and providing alerts illustrated in FIG. 1.

Referring now to FIG. 2, a general flowchart illustrating a method 100 for operating the emergency detection system illustrated in FIG. 1 is shown. The method begins, at 202, where the method 200 includes operating an emergency server, at 204, comprising an alert database storing contact information for each person on an alert feed list, where the emergency server is configured to provide an alert to each person on the alert feed list using the respective contact information when an emergency event is detected.

Moving to 206, the method includes operating a client device having a display, and configured to communicate with the emergency server, and comprising a microphone for detecting audible signals which is not tuned to any unique signature of the non-verbal audible signals. The microphone 110 is not tuned to any unique signature of the non-verbal audible signals but rather can transmit all non-verbal audible signals for processing by the system 100 using the warning database 118. The method also includes, at 208, operating an emergency validator comprising a warning database for assessing safety situations. Operating of the emergency validator includes, at 210, receiving at least one audible signal from the client device, comparing the at least one audible signal, at 212, to the warning database, where the warning database has a plurality of warning signals stored therein, and, at 214, transmitting a trigger signal to the emergency server when the at least one audible signal is a match to at least one warning signal of the plurality of warning signals to indicate an emergency event has been detected. The method ends at 216.

Figure 3:
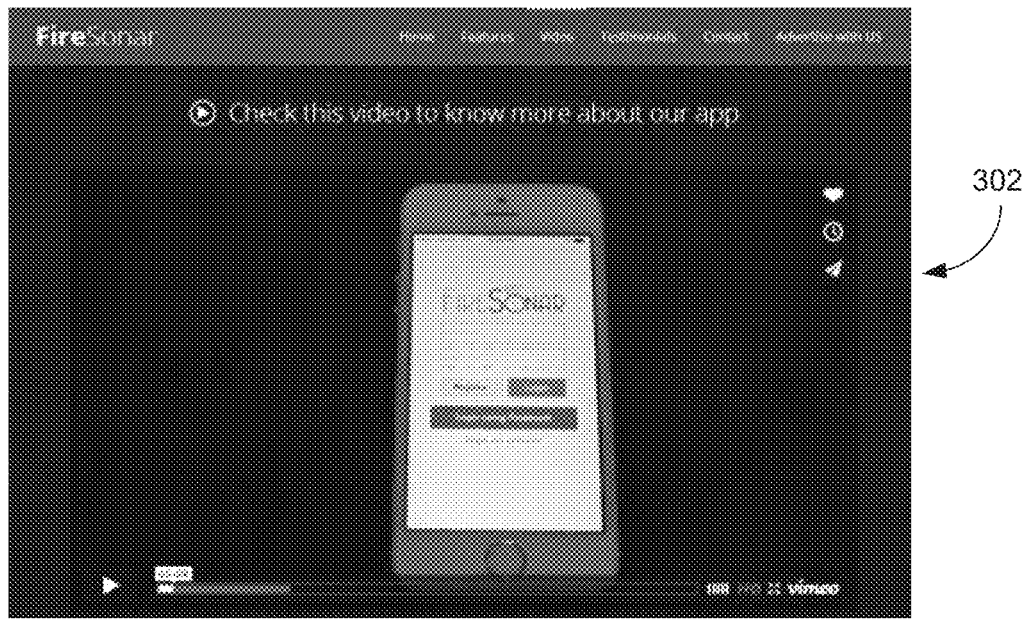
FIG. 3 is a graphical user interface ("GUI") display of a client device illustrated in FIG. 1.
Figure 4:
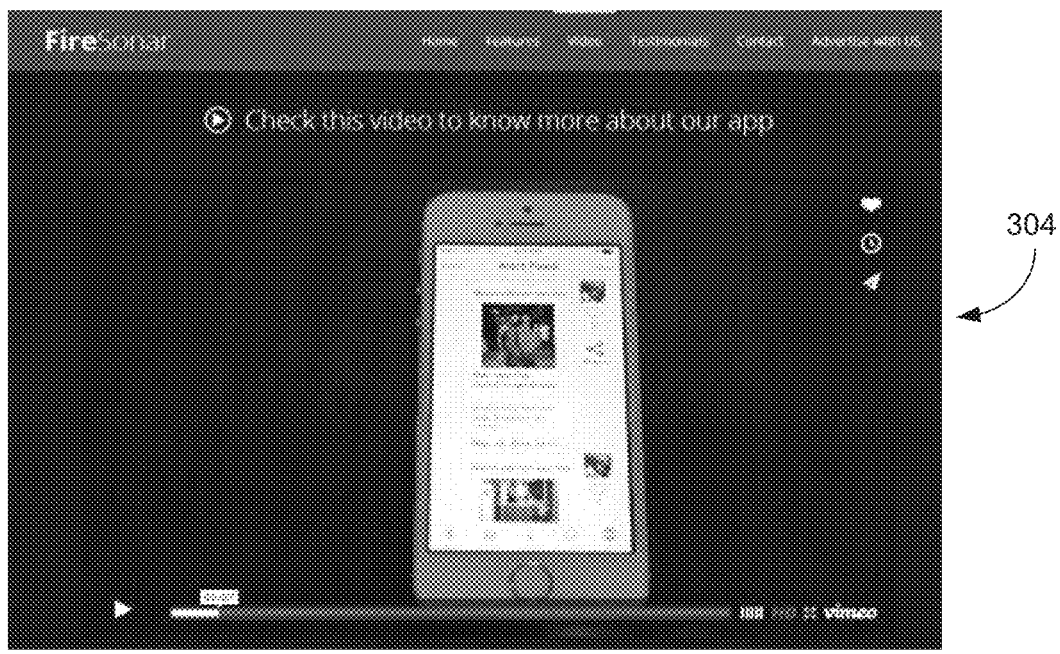
FIG. 4 is a screen shot of an alert feed list of the emergency server illustrated in FIG. 1.

Referring now to FIG. 3 showing a screen shot 302, a user may access a graphical user interface ("GUI") 114 known as FireSonar™ on a client device 108 such as a smartphone by entering a user ID and a password. Once the GUI 114 has been opened on the client device 108, the user can view the alert feed list 106 that shows any alerts that have been transmitted by anyone on the list, as illustrated in the screenshot 304 of FIG. 4.

Figure 5:
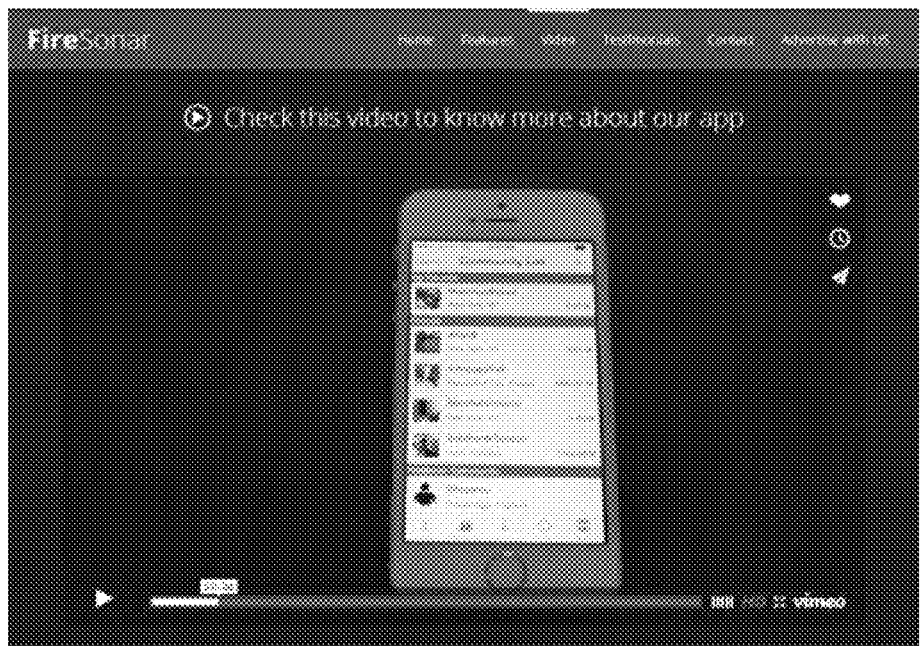
FIG. 5 is a GUI that enables the user to view and add contacts to his or her alert feed list.

The persons 105A-105N on the alert feed list 106 will receive an alert on their respective smartphone when an emergency event 130 is triggered. To add persons to the alert feed list 106, the user can view the community, as shown in the screenshot 306 FIG. 5, and use the GUI 114 to add the selected persons. The community comprises those persons that subscribe to the system 100 and each user can create his or her own alert feed list 106.

Figure 6:
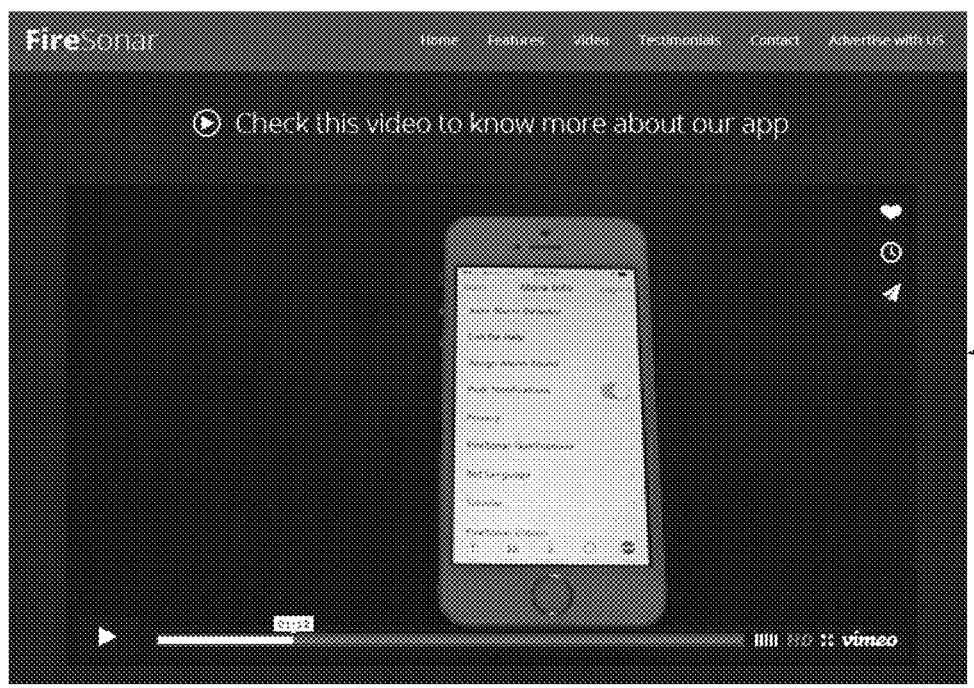
FIG. 6 is a GUI to allow the user to toggle various features of the system illustrated in FIG. 1.

The functions and features of the system 100 may be selected using the GUI 114 shown in the screenshot 308 of FIG. 6. The user can toggle the automatic alarm function using this GUI 114. The automatic alarm function is so that existence of an emergency event 130 will be triggered automatically by the client device 108 detecting an audible signal 132 from a smoke detector (or gunshot), example, where the audible signal 132 from the smoke detector is based on a unique sound signature consistent with a smoke alarm. The emergency event 130 may also be triggered manually by the user.

Figure 7:
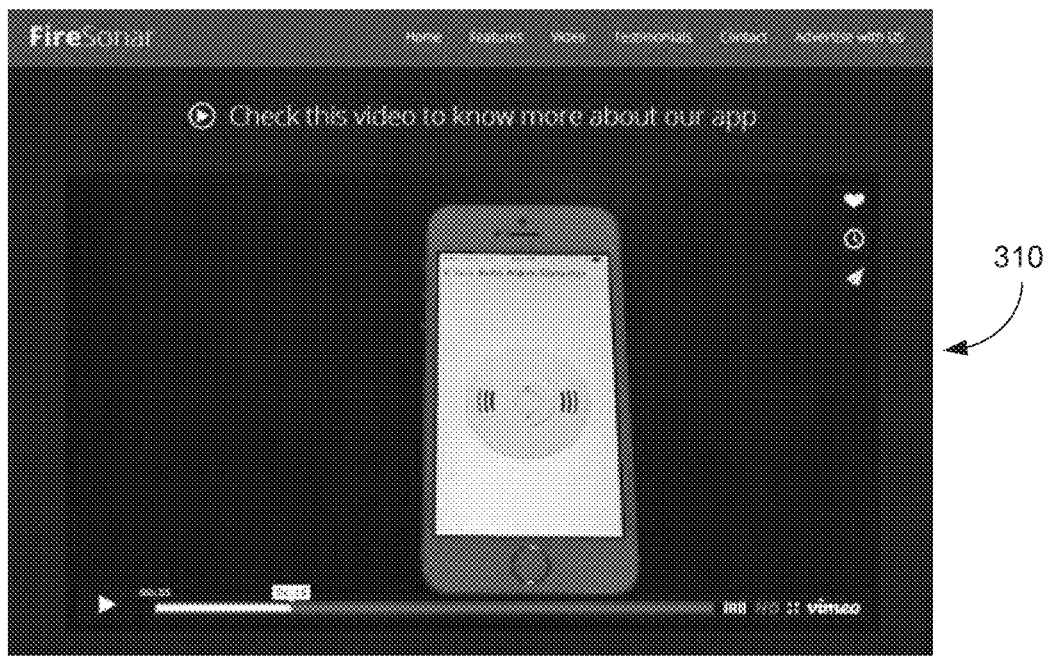
FIG. 7 is a picture of a smoke detector that when pressed activates the system and turns a microphone on of the client device.

Once the user toggles the automatic alarm function shown in FIG. 6, the user will be presented with another screen on the GUI 114 shown in the screenshot 310 of FIG. 7 that the user may use to activate the automatic alarm function and turn on the microphone 110 of the client device 108. The microphone 110 is not tuned to any unique signature of the non-verbal audible signals so that it is not limited to responding compared to systems. Because the microphone 110 is not tuned to any unique signature of the non verbal audible signals, the system 100 can process all non-verbal audible signals for using the database 118 for determining an emergency event. The system 100 may also include a delay feature so that that the user may cancel the alert before it is transmitted to the persons on the alert feed list 106 in the event of the false alarm or the user otherwise wishes to cancel the alert.

Figure 8:
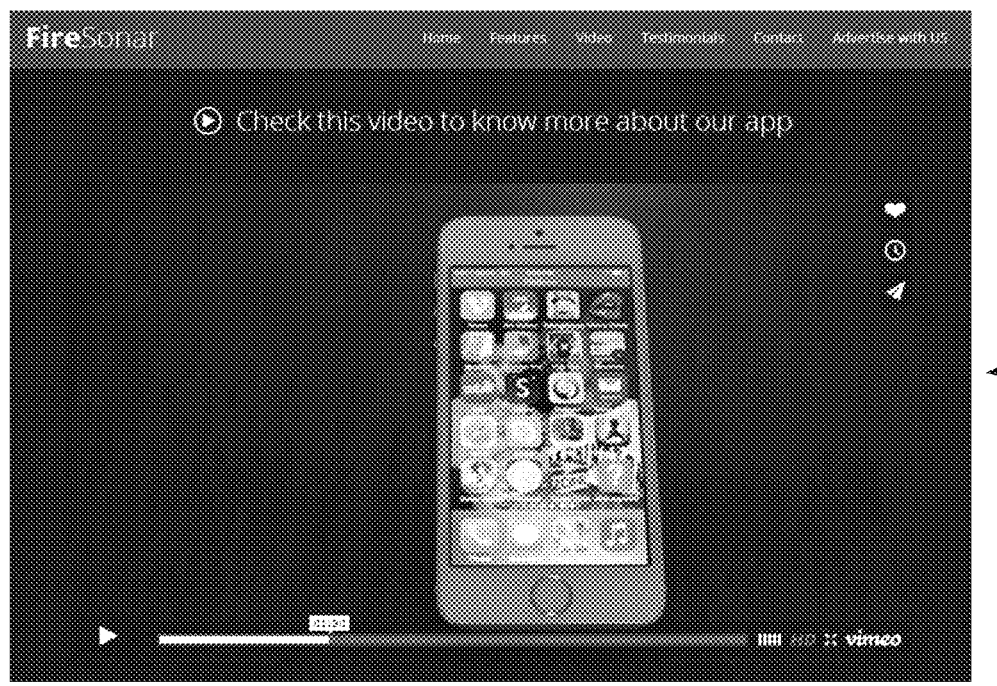
FIG. 8 illustrates a visual indicator on the display of the client device that the system is activated.

Referring note to the screenshot 312 of FIG. 8, a visual indicator 112 may be viewable on a screen of the client device 108 so that the user will know that the system 100 is running. For example, the visual indicator 112 may be a banner at the top of the client device 108 display 114.

Figure 9:
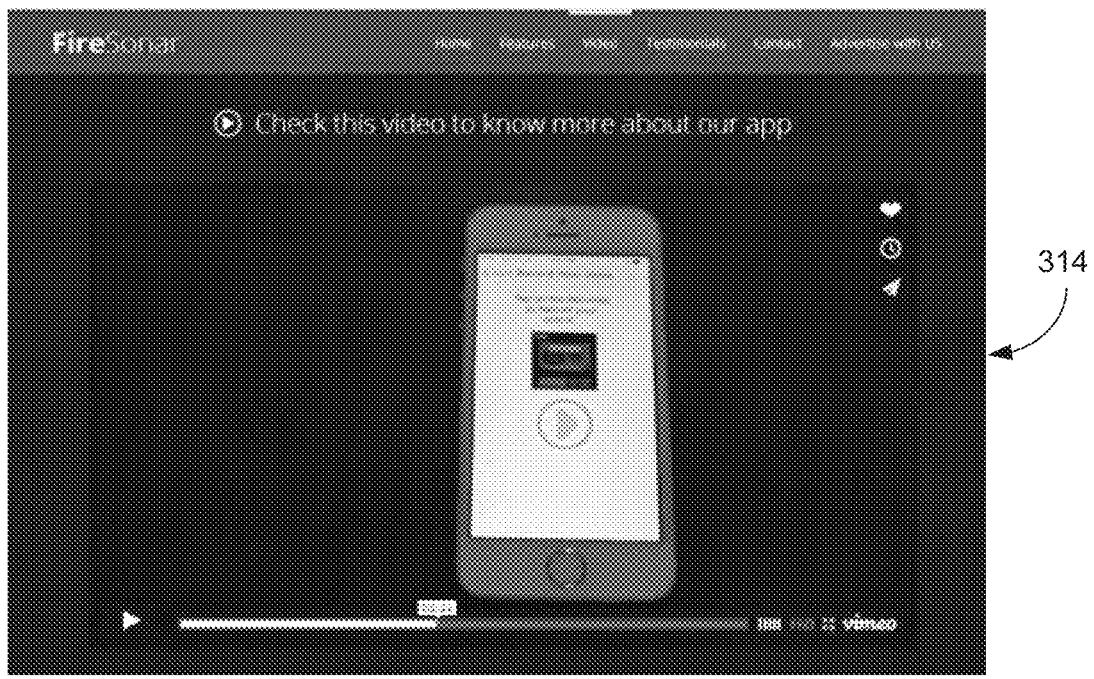
FIG. 9 is a GUI for the user to record a voice message that is played when an alert is transmitted to a person on the alert feed list.

The alert that is transmitted to those persons 105A-105N on the alert feed list 106 may be a typical alarm or siren type sound, or it may be a voice message. A voice message is more effective in some situations to rouse a person from sleep or to otherwise gain their attention. In order to record and store a voice message, the user can use the GUI 114 that is depicted in the screenshot 314 in FIG. 9 to record a particular voice message.

Figure 10:
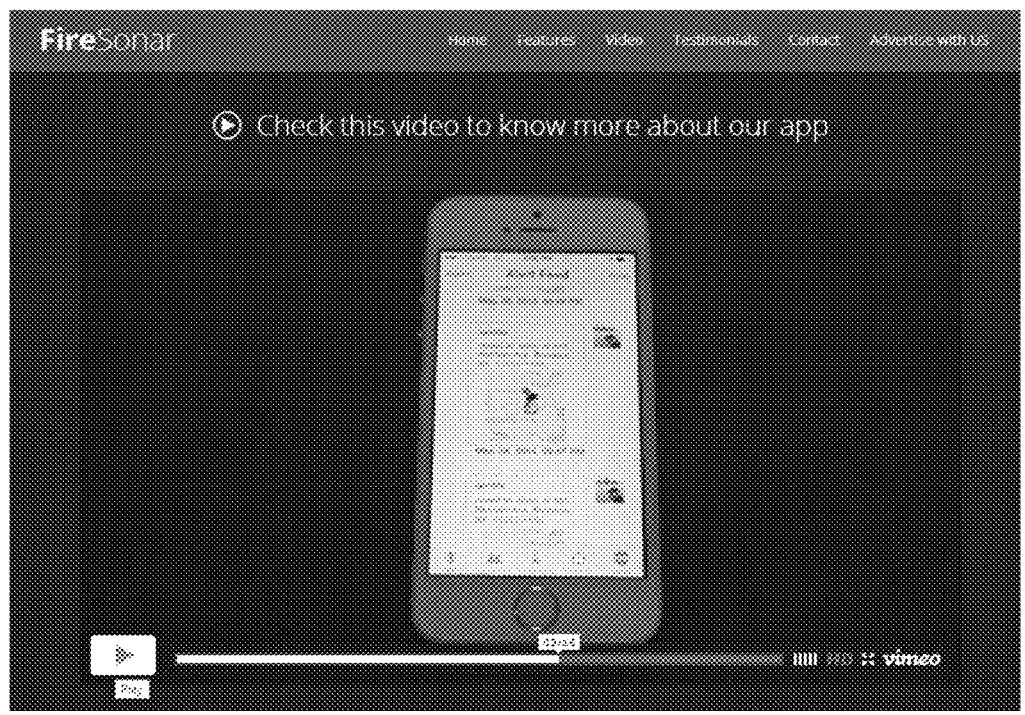
FIG. 10 is a screen shot displaying a map of a physical location of the emergency alert.

When an alert is transmitted and is displayed on the alert feed list 106, the alert may include a physical location of the emergency event, 130 as illustrated in the screenshot 316 of FIG. 10. The physical location may be displayed on a map to indicate the location of the emergency event 130. The map may also indicate the physical locations of others that are included on the alert feed list 106 or community list. The additional physical locations of others on the map may be the location of his or her respective client device 108, or the physical address where they live, or any combination thereof.

Figure 11:
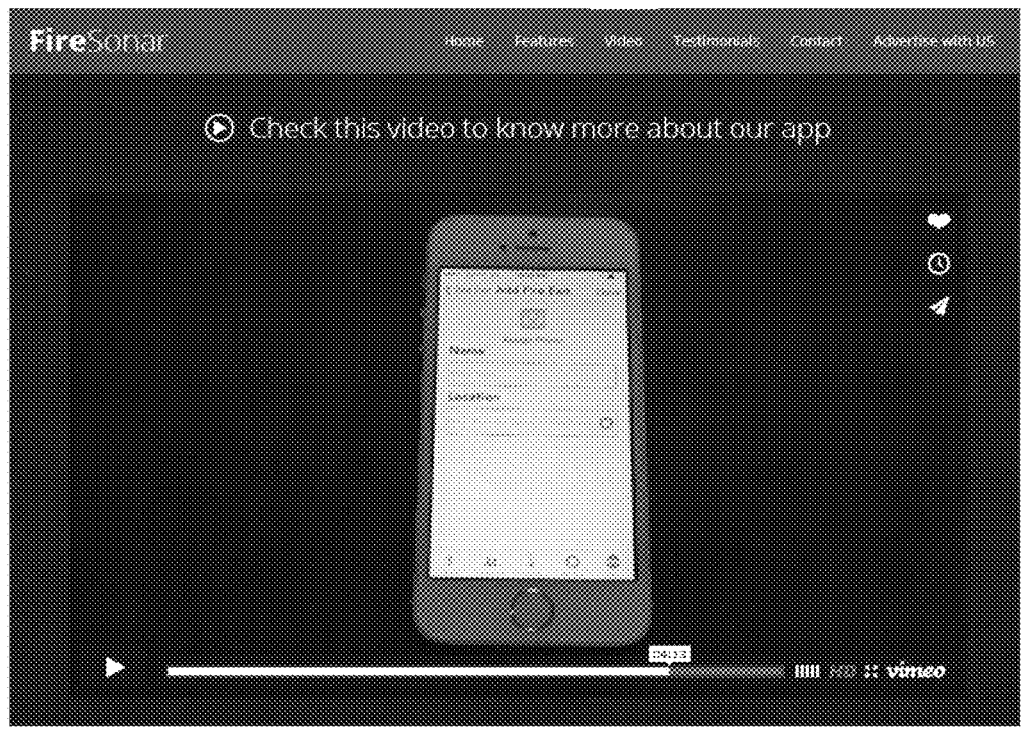
FIG. 11 is a GUI for the user to associate pictures and locations to guide the user to an exit.
Figure 12:
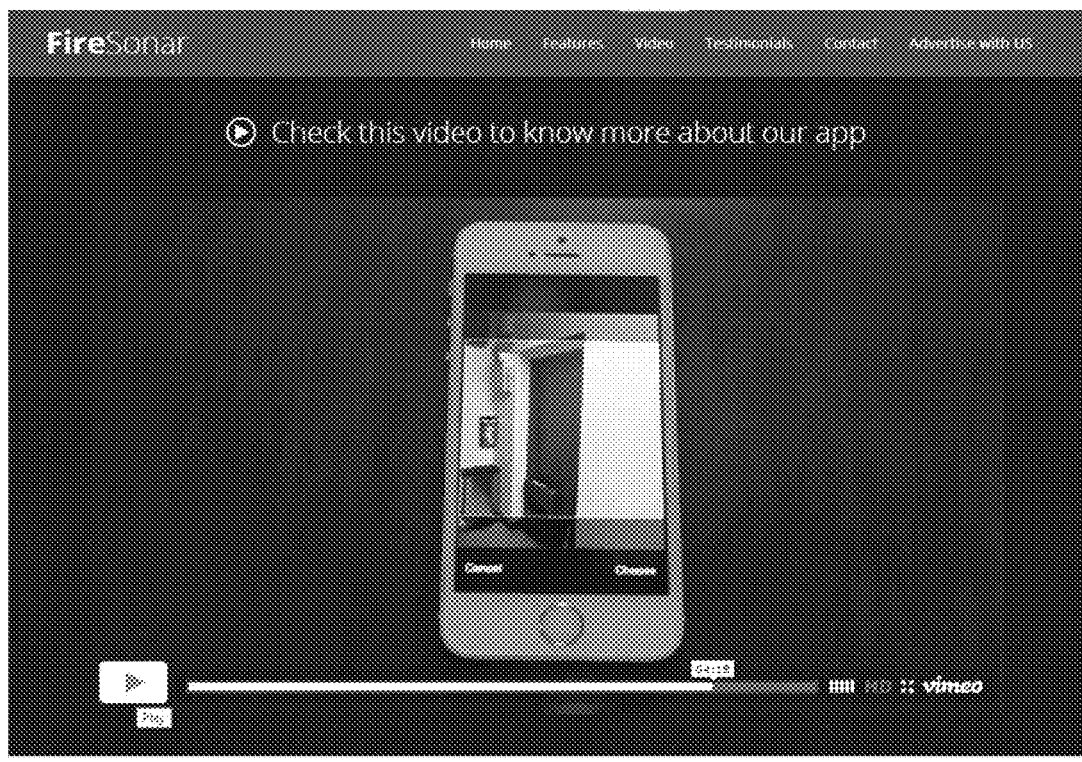
FIG. 12 is a picture of an exit that may be displayed during an emergency event.
Figure 13:
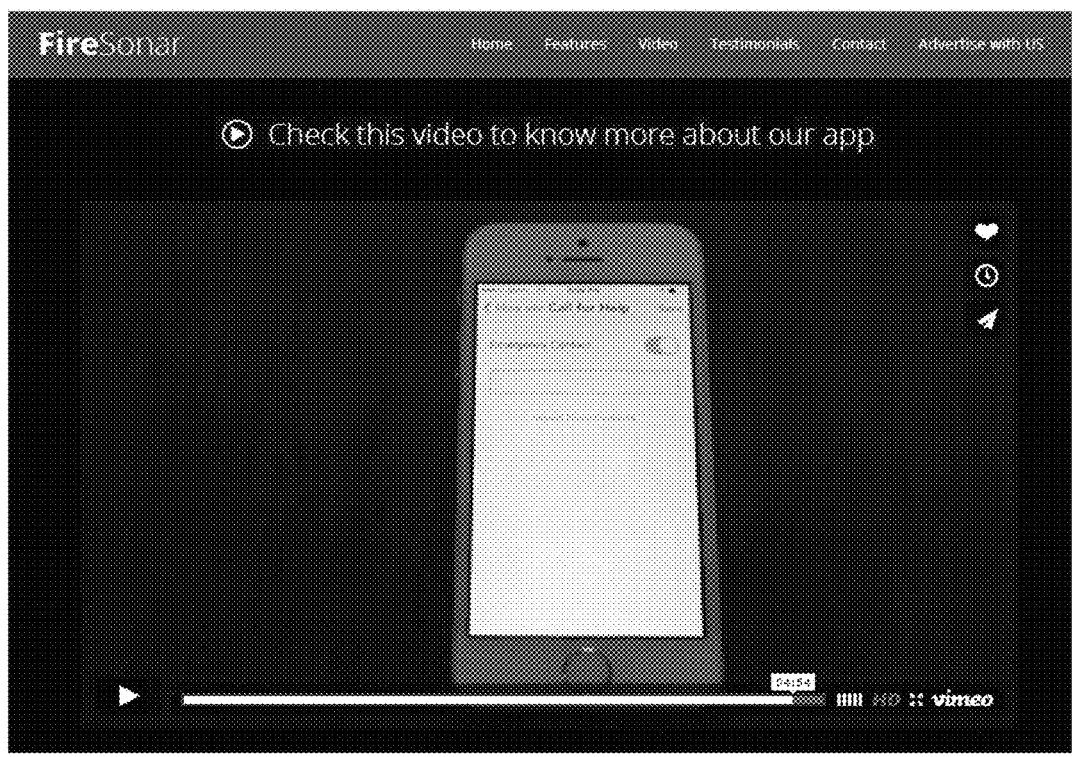
FIG. 13 is a GUI for the user to manually enter an emergency number that may be automatically called during an emergency event.

Further, the system includes a feature that is used to guide a user to an exit. This may include pictures of an emergency exit that are stored of a particular egress route. A map or floor plan of a building may also be included so that the pictures and map are correlated with a location of where the emergency event is located in order to guide the user to an exit. A screenshot 318 of the GUI 114 shown in FIG. 11 can be used to assign names and locations of particular egress routes, along with pictures showing the exit so that a user will know what he or she is looking for as depicted in the screenshot 320 of FIG. 11.

In addition to automatically providing pictures and a map for a possible exit, an emergency number can also be automatically dialed when the alert is triggered. The emergency number can be entered using the GUI 114 shown in the screenshot 322 of FIG. 11. The emergency number can be that of the local fire or police department, for example.

As explained above, the system 100 can detect an audible alert from an emergency event 130 such as a smoke detector, or gunshot using a microphone, transmit the alert to devices of other persons 105A-105N, establish the location of the possible emergency event, alert persons in proximity to the emergency event, and transmit the alert to persons whose contact information is stored on an alert feed list 106. The microphone 110 is not tuned to any unique signature of the non-verbal audible signals but rather can transmit all non-verbal audible signals for processing by the system 100 using the warning database 118. Thus, it can be used to detect a much larger number of emergency events 130 than existing microphones tuned to a unique signature. In addition, the system 100 includes memory to store pictures of an emergency exit along with a visual map of a particular egress route, where the pictures and visual map are correlated with a location of where the emergency event is located in order to guide the user to an exit.

Smoke alarms (both the ionization and photoelectric types) commonly use a piezoelectric horn to indicate to an occupant that the smoke alarm has activated. Piezoelectric horns are popular in smoke alarms because they can output significant sound levels without using much power. Depending on the piezoelectric horn design, the maximum sound pressure level can vary but is typically rated at a minimum of 85 dBA at 10 feet away as specified in the Underwriters Laboratories' voluntary standard for smoke alarms, UL 217 Single and Multiple Station Smoke Alarms. Residential smoke alarm signals are required to use a temporal-three pattern as specified in American National Standard ANSI S3.41, Audible Emergency Evacuation Signal. The temporal-three pattern was standardized to be used as an audible emergency evacuation signal. The temporal-three pattern does not limit the signal to one sound (such as a bell, horn, ring, chime, or electronic sound) but, rather, to a sound pattern. This also does not limit the frequency or combinations of sound types that can be used in the temporal-three pattern.

Figure 14:
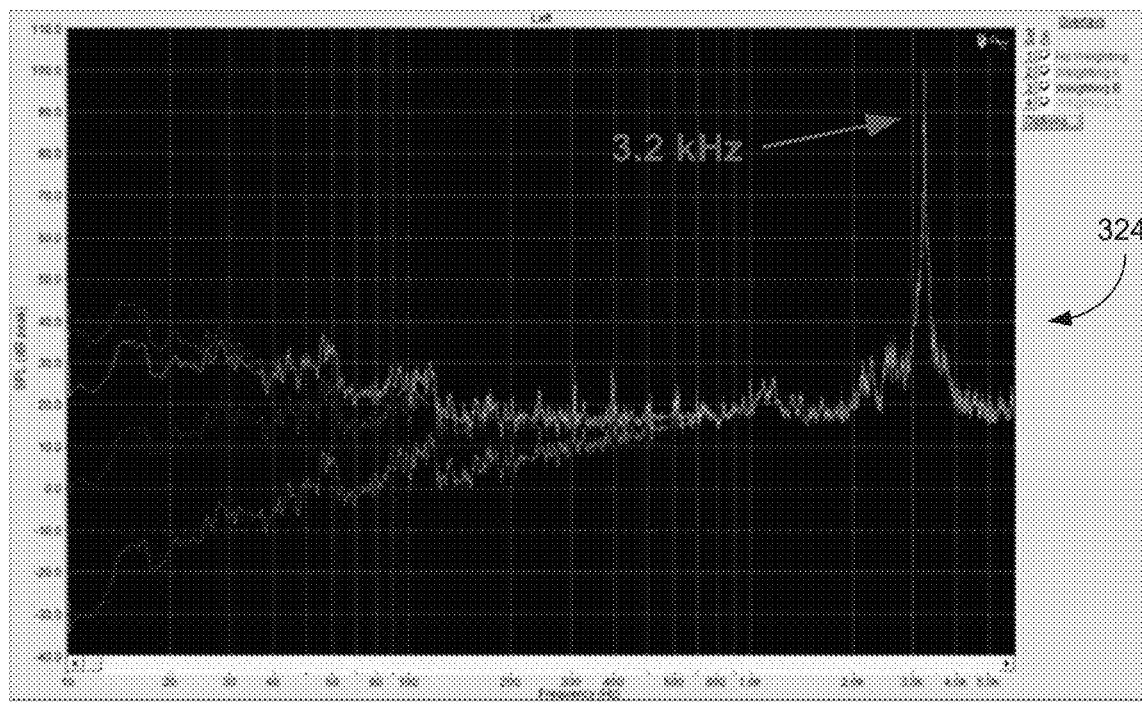
FIG. 14 is a spectral plot of the alarm signature of a common household smoke detector.

For typical smoke alarms, the frequency of the horn output is between 3,000 to 4,000 Hz. As shown in FIG. 14, the frequency of the signal for a particular tested smoke alarm 324 was 3.2 kHz. In addition, UL 217-Single and Multiple Station Smoke Alarms, requires an A-weighted sound pressure level of at least 85 decibels (dBA) when measured at a distance of 10 feet from the horn, in a room of a specific configuration and under specific conditions (UL, 1997).

Figure 15:
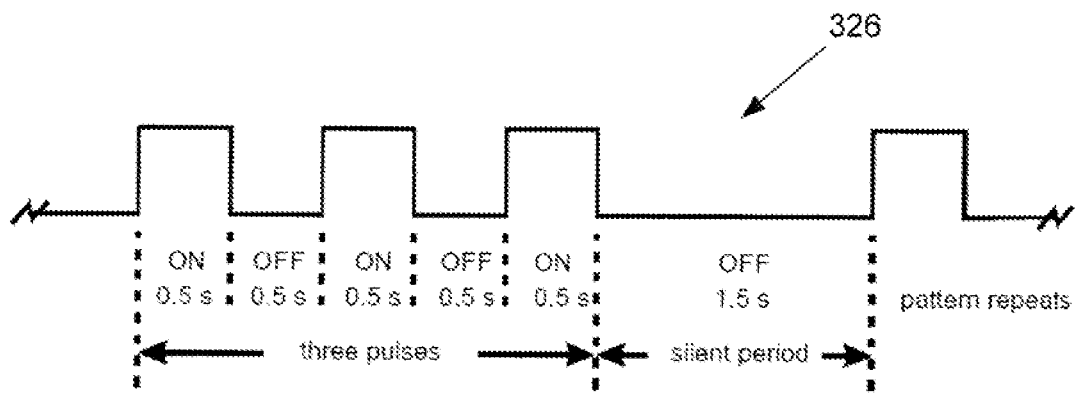
FIG. 15 is a pulse amplitude profile standard for smoke and fire alarms.
Figure 16:
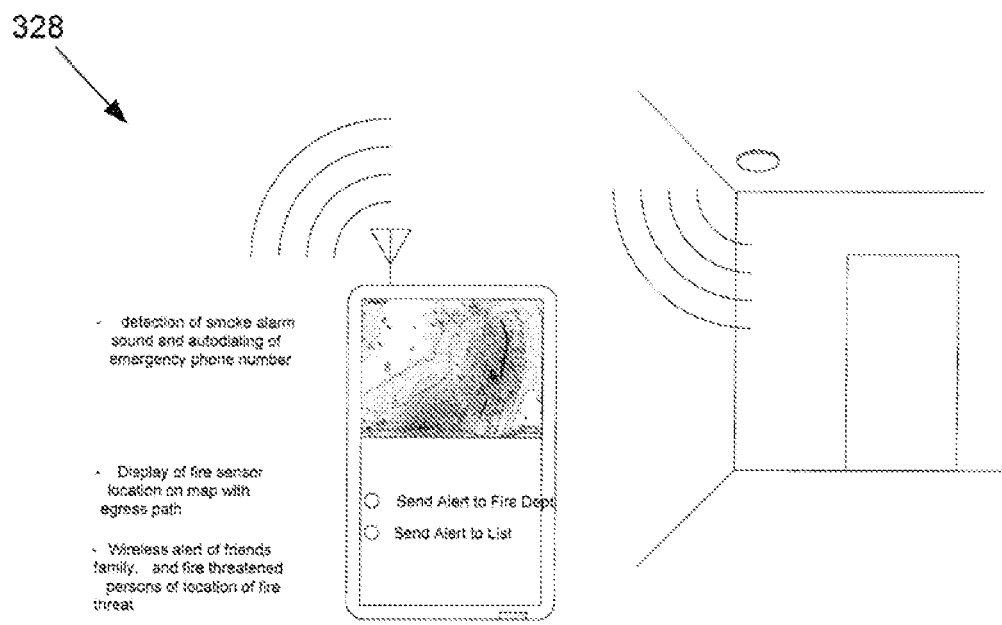
FIG. 16 is a conceptual diagram of the system to provide emergency alerts.

FIG. 15 shows the required pulse amplitude modulation waveform 326. These pulses are associated most commonly with tone bursts for typical smoke alarms, however any spectrum of sound can be burst in this fashion.

Hence the common acoustic alarm signature comprises pulse trains of tonal emissions, but there will be variants that exhibit pulse trains of other wider band emissions associated with sounds other than tones. The system and method can use Goertzel's algorithm natively after the fashion of its use in smartphones to detect DTMF (electronic dialing) tones. This may be more computationally efficient that using FFT filter banks for a finite number of tones. Alternatively, alarm sound patterns can be matched with a library of sounds stored in the smartphone. Within the scope of the system and method, is the prospect of processing sound files on a wirelessly connected remote server.

Referring now to FIG. 15, a conceptual diagram of the system 100 is illustrated. A conventional smoke detector is depicted emitting an audible alarm indicative of smoke present in the environment. The microphone of the client device 108 detects the audible alarm signature from the smoke detector. The microphone 110 is not tuned to any unique signature of the non-verbal audible signals but rather can transmit all non-verbal audible signals for processing by the system 100 using the database 118. As a result, the system 100 displays a map depicting the location of the emergency event or alarm location. In this or other maps generated by the system 100, the location of other persons on the alert feed list 106 may be depicted. The system 100 provides the persons 105A-105N with the option of wirelessly responding to the alert by autodialing the emergency response authorities and messaging to a list of persons that might include friends, family, or others in the threat area, or this may be done automatically.

The present system 100 and method can exploit social networking to relay alerts to family and friends. Text, phone, and other emergency messaging can be provided by the system 100 to friends and family. Alert maps can be shared with persons of interest to: a) show the user they are in a fire threat area, b) show friends and family where in a fire threat area they are located, c) show persons in the vicinity who can help, where persons at risk are located in the threat area, and d) show the smartphone user the location of others in the fire threat area.

In another aspect, the system 100 is configured to receive a video and/or audio feed from a remote device such as a camera. For example, the user can wear a button, broach, or other similar item on the person that conceals the camera. The data from the camera can be transmitted to the user's client device 108 using Bluetooth or other technology that can synchronize the camera to the client device and GUI 114. In addition, the camera can be triggered to begin operating by using a "keyword" that is spoken by the user. The video and voice data can be streamed live to others using the GUI, and/or can be stored on the client device, cloud, or other means well known to those of ordinary skill in the art. The system 100 is configured to send an alert and also is configured for others to see what is happening so that they can call for help if necessary.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An emergency detection and alert system comprising:
an emergency server comprising an alert database storing contact information for each person on an alert feed list, and the emergency server configured to provide an alert to each person on the alert feed list using the respective contact information when an emergency event is detected;
a mobile client device having a display, and configured to communicate with the emergency server, and comprising a microphone for detecting non-verbal audible signals that are generated separate from the client device and a user, wherein the microphone is not tuned to any unique signature of the non-verbal audible signals; and
an emergency validator comprising a warning database for assessing safety situations and a processor, and the processor configured to perform the following:
receive at least one non-verbal audible signal from the client device,
compare the at least one non-verbal audible signal to the warning database, the warning database having a plurality of warning signals stored therein, and
transmit a trigger signal to the emergency server when the at least one non-verbal audible signal is a match to at least one warning signal of the plurality of warning signals to indicate an emergency event has been detected.

2. The emergency detection and alert system of claim 1, wherein the emergency validator is configured to transmit the trigger signal in response to manual input of the user.

3. The emergency detection and alert system of claim 1, wherein the emergency validator is configured to wait a predetermined time period between when the at least one non-verbal audible signal is a match to at least one warning signal and when the trigger signal is transmitted to the emergency server to provide an opportunity for the user to cancel the alert using the client device before it is transmitted to each person on the alert feed list in the event of a false alarm.

4. The emergency detection and alert system of claim 1, wherein the client device further comprising a visual indicator configured to be viewable on the display of the client device when the system is operational.

5. The emergency detection and alert system of claim 1, wherein the alert comprises at least one of a voice message, a siren, email, and text message.

6. The emergency detection and alert system of claim 1, wherein the emergency validator is configured to determine and transmit a physical location of the emergency event and user location with the trigger alert.

7. The emergency detection and alert system of claim 6, wherein the emergency server is configured to store pictures and/or video of an emergency exit proximate to the user location and to transmit to the client device.

8. The emergency detection and alert system of claim 7, wherein the emergency server is configured to generate a visual map of a particular egress route to transmit to the client device to guide the user to the emergency exit.

9. A method for emergency detection and providing alerts comprising:
operating an emergency server comprising an alert database storing contact information for each person on an alert feed list, and the emergency server configured to provide an alert to each person on the alert feed list using the respective contact information when an emergency event is detected;
operating a mobile client device having a display, and configured to communicate with the emergency server, and comprising a microphone for detecting non-verbal audible signals that are generated separate from the client device and a user, wherein the microphone is not tuned to any unique signature of the non-verbal audible signals; and
operating an emergency validator comprising a warning database for assessing safety situations, and configured to perform the following:
receiving at least one non-verbal audible signal from the client device, comparing the at least one non-verbal audible signal to the warning database, the warning database having a plurality of warning signals stored therein, and transmitting a trigger signal to the emergency server when the at least one non-verbal audible signal is a match to at least one warning signal of the plurality of warning signals to indicate an emergency event has been detected.

10. The method for emergency detection and providing alerts of claim 9, wherein the emergency validator is configured to transmit the trigger signal in response to manual input of the user.

11. The method for emergency detection and providing alerts of claim 9, wherein operating the emergency validator further comprises waiting a predetermined time period between when the at least one non-verbal audible signal is a match to at least one warning signal and when the trigger signal is transmitted to the emergency server to provide an opportunity for the user to cancel the alert using the client device before it is transmitted to each person on the alert feed list in the event of a false alarm.

12. The method for emergency detection and providing alerts of claim 9, wherein the client device further comprising a visual indicator configured to be viewable on the display of the client device when the system is operational.

13. The method for emergency detection and providing alerts of claim 9, wherein the alert comprises at least one of a voice message, a siren, email, and text message.

14. The method for emergency detection and providing alerts of claim 9, wherein operating the emergency validator further comprises determining and transmitting a physical location of the emergency event and user location with the trigger alert.

15. The method for emergency detection and providing alerts of claim 14, wherein operating the emergency server further comprises storing pictures and/or video of an emergency exit proximate to the user location.

16. The method for emergency detection and providing alerts of claim 15, wherein operating the emergency server further comprises generating a visual map of a particular egress route to guide the user to the emergency exit.

17. A non-transitory computer readable medium for operating an emergency validator having a warning database and interfacing between a mobile client device and an emergency server, the mobile client device having a microphone not tuned to any unique signature of the non-verbal audible signals, and with the non-transitory computer readable medium having a plurality of computer executable instructions for causing the emergency validator to perform steps comprising:

receiving at least one non-verbal audible signal from the client device that is generated separate from the client device and a user;

comparing the at least one non-verbal audible signal to the warning database, the warning database having a plurality of warning signals stored therein, and transmitting a trigger signal to the emergency server when the at least one non-verbal audible signal is a match to at least one warning signal of the plurality of warning signals to indicate an emergency event has been detected.

18. The non-transitory computer readable medium of claim 17, wherein the emergency validator further comprises determining and transmitting a physical location of the emergency event and user location with the trigger alert.

19. The non-transitory computer readable medium of claim 18, wherein the emergency server further comprises storing pictures and/or video of an emergency exit proximate to the user location.

20. The non-transitory computer readable medium of claim 19, wherein the emergency server further comprises generating a visual map of a particular egress route to guide the user to the emergency exit.

* * * * *